(12) United States Patent
Perry

(10) Patent No.: US 8,362,634 B2
(45) Date of Patent: Jan. 29, 2013

(54) MODULAR POWER SOURCE FOR TRANSMITTER ON BORING MACHINE

(76) Inventor: Eugene D. Perry, Mooresville, IN (US)

( * ) Notice: Subject to any disclaimer, the term of this patent is extended or adjusted under 35 U.S.C. 154(b) by 398 days.

(21) Appl. No.: 12/827,639

(22) Filed: Jun. 30, 2010

(65) Prior Publication Data

US 2010/0327681 A1 Dec. 30, 2010

Related U.S. Application Data

(60) Provisional application No. 61/221,872, filed on Jun. 30, 2009.

(51) Int. Cl.
*F03B 13/00* (2006.01)
(52) U.S. Cl. ............................................ 290/54; 175/26
(58) Field of Classification Search .................. None
See application file for complete search history.

(56) References Cited

U.S. PATENT DOCUMENTS

| | | | |
|---|---|---|---|
| 4,491,738 A | 1/1985 | Kamp | |
| 4,716,657 A | 1/1988 | Collingwood | |
| 5,269,383 A | 12/1993 | Forrest | |
| 5,316,090 A * | 5/1994 | Kuwana et al. | 175/24 |
| 6,446,728 B2 | 9/2002 | Chau et al. | |
| 6,579,215 B2 | 6/2003 | Katoh et al. | |
| 6,691,802 B2 | 2/2004 | Schultz et al. | |
| 6,885,918 B2 | 4/2005 | Harmon et al. | |
| 7,057,316 B2 | 6/2006 | Spring | |
| 7,133,325 B2 | 11/2006 | Kotsonis et al. | |
| 7,140,818 B2 | 11/2006 | Kato | |
| 7,165,608 B2 | 1/2007 | Schultz et al. | |
| 7,337,858 B2 | 3/2008 | Hall et al. | |
| 7,347,283 B1 | 3/2008 | Sharp et al. | |
| 7,728,464 B2 * | 6/2010 | Leininger | 310/43 |

\* cited by examiner

*Primary Examiner* — Vanessa Girardi
(74) *Attorney, Agent, or Firm* — Barnes & Thornburg LLP

(57) ABSTRACT

A modular power source includes an outer housing, a generator module, and a control module. The generator module and the control module are electrically interconnected and are positioned to lie within a module space formed within the outer housing. Electricity is produced by the generator module during rotation of the modular power source.

22 Claims, 14 Drawing Sheets

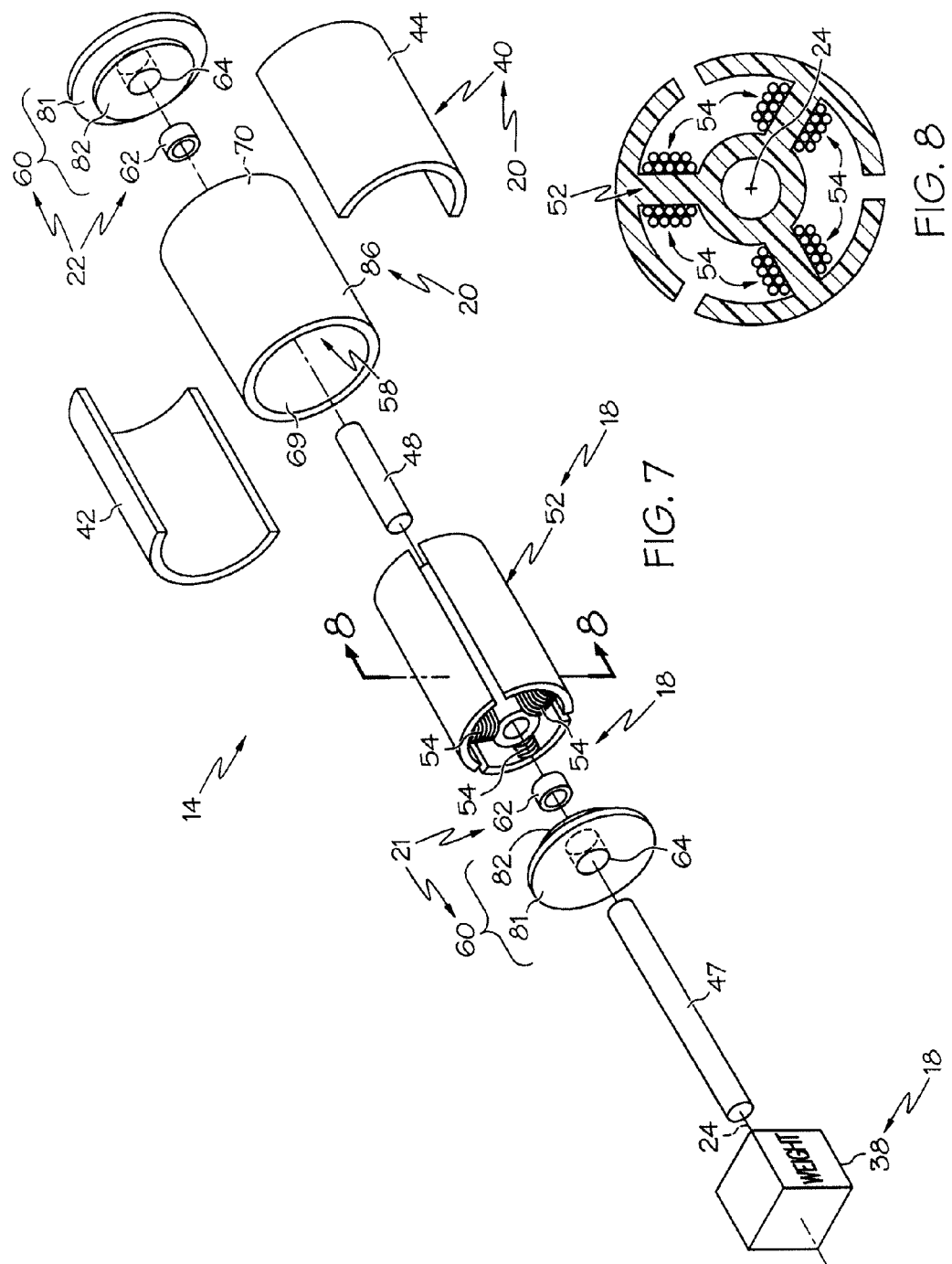

MODULAR POWER SOURCE FOR TRANSMITTER ON BORING MACHINE

This application claims priority under 35 U.S.C. §119(e) to U.S. Provisional Application Ser. No. 61/221,872, filed Jun. 30, 2009, which is expressly incorporated by reference herein.

BACKGROUND

The present disclosure relates to a power source, and particularly to an electricity generating power source. More particularly, the present disclosure relates to a rechargeable electricity generating power source.

SUMMARY

According to one aspect of the present disclosure, a hand-held modular power source is configured for use in a rotating apparatus such as an underground boring head of a drill string to provide electrical power to another component in the rotating apparatus. The hand-held modular power source includes an outer housing, a control module, and a generator module. The outer housing includes a cover tube, a first conductor cap coupled to a first end of the cover tube, and a second conductor cap coupled to an opposite second end of the cover tube. The cover tube, the first conductor cap, and second conductor cap cooperate to define a module space therebetween. The control module is positioned in the module space near the second conductor cap and includes a control system and an energy storage unit. The energy storage unit is electrically coupled to the control system and the control system is electrically coupled to both the first and second conductor caps. The generator module is positioned to lie in the module space between the first conductor cap and the control module and the generator module includes a gravity-positioned stator and a relative rotor coupled to the gravity-positioned stator for rotation about a central axis. The gravity-positioned stator and the relative rotor are configured to rotate relative to each other. The gravity-positioned stator includes a weight that is configured to move therewith. The weight is positioned to lie in the module space and have a center of gravity offset from the central axis.

In one illustrative embodiment, the gravity-positioned stator may further include a magnetic core that is configured to provide a magnetic field. The magnetic core is rigidly coupled to the weight. The gravity-positioned stator may further include a post positioned between and rigidly coupling the weight to the magnetic core.

In another illustrative embodiment, the relative rotor may include a winding coil and a generator housing. The winding coil is positioned in spaced-apart relation to the magnetic core and is configured to move rotationally about the central axis relative to the magnetic core. The generator housing is coupled to and positioned to lie between the winding coil and the outer housing.

In another illustrative embodiment, the weight may include a front surface, an opposite rear surface, and a passageway. The front surface is formed to include a first aperture, the rear surface is formed to include a second aperture, and the passageway is arranged to extend between the first and second apertures. The post, included in the gravity-positioned stator, is received through the first and second apertures. In another illustrative embodiment, the weight may define a generally triangular cross-sectional shape and may include a tungsten material.

In still another illustrative embodiment, the outer housing may further include a housing cap. The housing cap is coupled to the first conductor cap and the cover tube to move therewith. The housing cap is configured to mate with the post of the gravity-positioned stator for rotation with the first conductor cap and the cover tube about the central axis relative to the gravity-positioned stator.

In yet another illustrative embodiment, the modular power source may further include a support coupled to the relative rotor to move therewith. The support is positioned between the winding bobbin of the gravity-positioned stator and the weight. The support is formed to include a support aperture and the post of the gravity-positioned stator is received through the support aperture.

In still another illustrative embodiment, the gravity-positioned stator may further include a winding bobbin and a coil. The coil is wrapped around the winding bobbin to move with the winding bobbin. The relative rotor may include a rotor tube and a magnetic sleeve. The rotor tube is positioned in spaced-apart relation to the winding bobbin and the magnetic sleeve is coupled to the rotor tube to move therewith.

In yet another illustrative embodiment, the gravity-positioned stator may further comprise a magnetic sleeve configured to provide a magnetic field. The magnetic sleeve is rigidly coupled to the weight to move with the weight. In another illustrative embodiment, the weight has a cross-section that is generally frusto-circular in shape.

In still another illustrative embodiment, the modular power source may be sized and configured to be able to be held in a user's hand. Further illustratively, a length of the modular power source may be approximately 4-8 inches and a diameter of the modular power source may be approximately 1-2 inches.

According to another aspect of the present disclosure, a hand-held modular power source is configured for use in a rotating apparatus such as an underground boring head of a drill string to provide electrical power to another component in the rotating apparatus. The hand-held modular power source includes an outer housing, a control module, and a generator module. The outer housing includes a cover tube, a first conductor cap coupled to a first end of the cover tube and a second conductor cap coupled to an opposite second end of the cover tube. The cover tube, the first conductor cap, and second conductor cap cooperate to define a module space therebetween. A control module is positioned to lie in the module space near the second conductor cap. The control module includes an energy storage unit and a control system. The energy storage unit is electrically coupled to the control system and the control system is electrically coupled to both the first conductor cap and the second conductor cap. The generator module is positioned to lie in the module space near the first conductor cap. The generator module includes a gravity-positioned stator and a relative rotor coupled to the gravity-positioned stator for rotation about a central axis relative to the gravity-positioned stator. The gravity-positioned stator includes a weight having a center of gravity offset from the central axis. The weight is configured to cause the gravity-positioned stator to remain at 0 degrees of rotation relative to the relative rotor while the relative rotor rotates about the central axis.

In one illustrative embodiment, the gravity-positioned stator may further include a magnetic core that is rigidly coupled to the weight for rotational movement with the weight relative to the relative rotor. In another illustrative embodiment, the gravity-positioned stator may further comprise a post that is coupled to and positioned between the weight and the magnetic core. The weight defines a generally triangular cross-sectional shape.

In another illustrative embodiment, the gravity-positioned stator may further include a magnetic sleeve. The magnetic sleeve is coupled to an outer surface of the weight for rotational movement with the weight relative to the relative rotor.

According to still another aspect of the present disclosure, a combination position transmitter and modular power source are provided. This combination is configured for use within a rotatable underground boring head of a drill string and includes a position transmitter including a radio configured to emit a radio signal adapted to be received by a position-transmitter receiver. The combination further includes a hand-held modular power source configured to electrically power the position transmitter. The modular power source includes an outer housing, a control module, and a generator module. The outer housing includes a cover tube, a first conductor cap coupled to a first end of the cover tube and a second conductor cap coupled to an opposite second end of the cover tube. The cover tube, the first conductor cap, and second conductor cap cooperate to define a module space therebetween. A control module is positioned to lie in the module space near the second conductor cap. The control module includes an energy storage unit and a control system. The energy storage unit is electrically coupled to the control system and the control system is electrically coupled to both the first conductor cap and the second conductor cap. The generator module is positioned to lie in the module space near the first conductor cap. The generator module includes a gravity-positioned stator and a relative rotor coupled to the gravity-positioned stator for rotation about a central axis relative to the gravity-positioned stator. The gravity-positioned stator includes a weight having a center of gravity offset from the central axis. The weight is configured to cause the gravity-positioned stator to remain at 0 degrees of rotation relative to the relative rotor while the relative rotor rotates about the central axis.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 5a shows the boring string at 0 degrees of rotation relative to a boring axis while the weight is also oriented at 0 degrees of rotation relative to a central axis of the modular power source;

FIG. 5b is a view similar to FIG. 5a showing the boring string at 90 degrees of rotation relative to the boring axis and showing that the weight has remained at 0 degrees while the outer housing has rotated 90 degrees about the central axis of the modular power source relative to the weight;

FIG. 5c is a view similar to FIG. 5b showing the boring string at 180 degrees of rotation relative to the boring axis and showing the weight remaining at 0 degrees and the outer housing has rotated in cooperation with the boring string to 180 degrees relative to the weight;

FIG. 7 is an exploded perspective view of an embodiment of the generator module showing that the generator module includes, from left to right, a gravity-positioned stator including a weight, a first end post, a first support including a cap and a bushing, a winding bobbin supporting a metal coil, and a second end post, and a relative rotor including a rotor tube and a pair of magnetic half sleeves configured to mate with the rotor tube, and a second end support;

FIG. 8 is a sectional view taken about line 8-8 of FIG. 7 showing the winding bobbin and the windings coupled around the bobbin;

FIG. 13a shows the boring string at 0 degrees of rotation relative to a boring axis while the gravity-positioned stator is also oriented at 0 degrees of rotation relative to a central axis of the modular power source;

FIG. 13b is a view similar to FIG. 13a showing the boring string at 90 degrees of rotation relative to the boring axis and showing that the gravity-positioned stator has remained at 0 degrees while the relative rotor has rotated 90 degrees about the central axis of the modular power source relative to the weighted core;

FIG. 13c is a view similar to FIG. 13b showing the boring string at 180 degrees of rotation relative to the boring axis and showing the gravity-positioned stator remaining at 0 degrees and the relative rotor having rotated in cooperation with the boring string to 180 degrees relative to the gravity-positioned stator;

DETAILED DESCRIPTION

Figure 1:
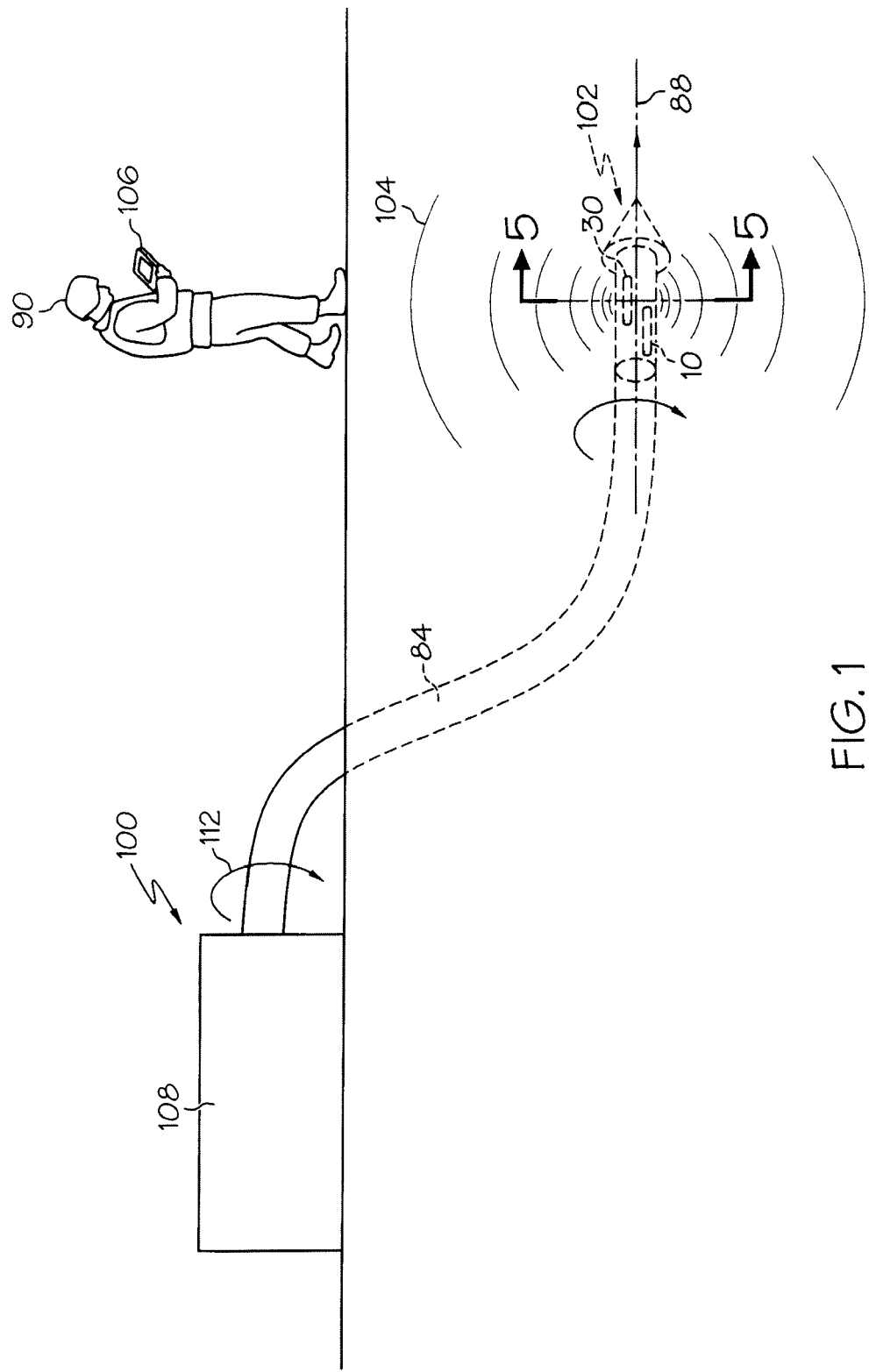
FIG. 1 is an elevational view of a horizontal boring machine including a hand-held modular power source that powers a position transmitter coupled near the end of an underground boring string.

A modular power source 10, as shown in FIGS. 1-6, is used to power a position transmitter 30 mounted on a boring head 102 of a boring rig 100. Illustratively, the modular power source 10 is hand-held and is illustratively configured for use with a rotating apparatus, such as an underground boring head 102 of a drill string 84. As shown in FIG. 1, a position transmitter 30, including a radio, emits a radio signal 104 that is received above ground by an operator 90 to determine the position of underground boring head 102 so that the direction and position of boring head 102 may be adjusted by operator 90 while boring rig 100 is in use, as is discussed in greater detail below. As suggested in FIGS. 5a-5c, modular power source 10 generates power via the rotational motion of boring head 102 in order to power the position transmitter 30. Another illustrative modular power source 110 is shown in FIGS. 10-14. Illustratively, while the modular power sources disclosed herein are configured for use within the boring head 102 of the drill string 84 in order to power the position transmitter 30, it is within the scope of this disclosure for the modular power sources disclosed herein to be used with other suitable rotating apparatuses in order to generate and provide electrical power to another component within the rotating apparatus. In other words, while the modular power sources described herein illustratively provide power to position transmitter 30, any other suitable electrical component may be provided electrical power by the illustrative modular power sources.

Figure 2:
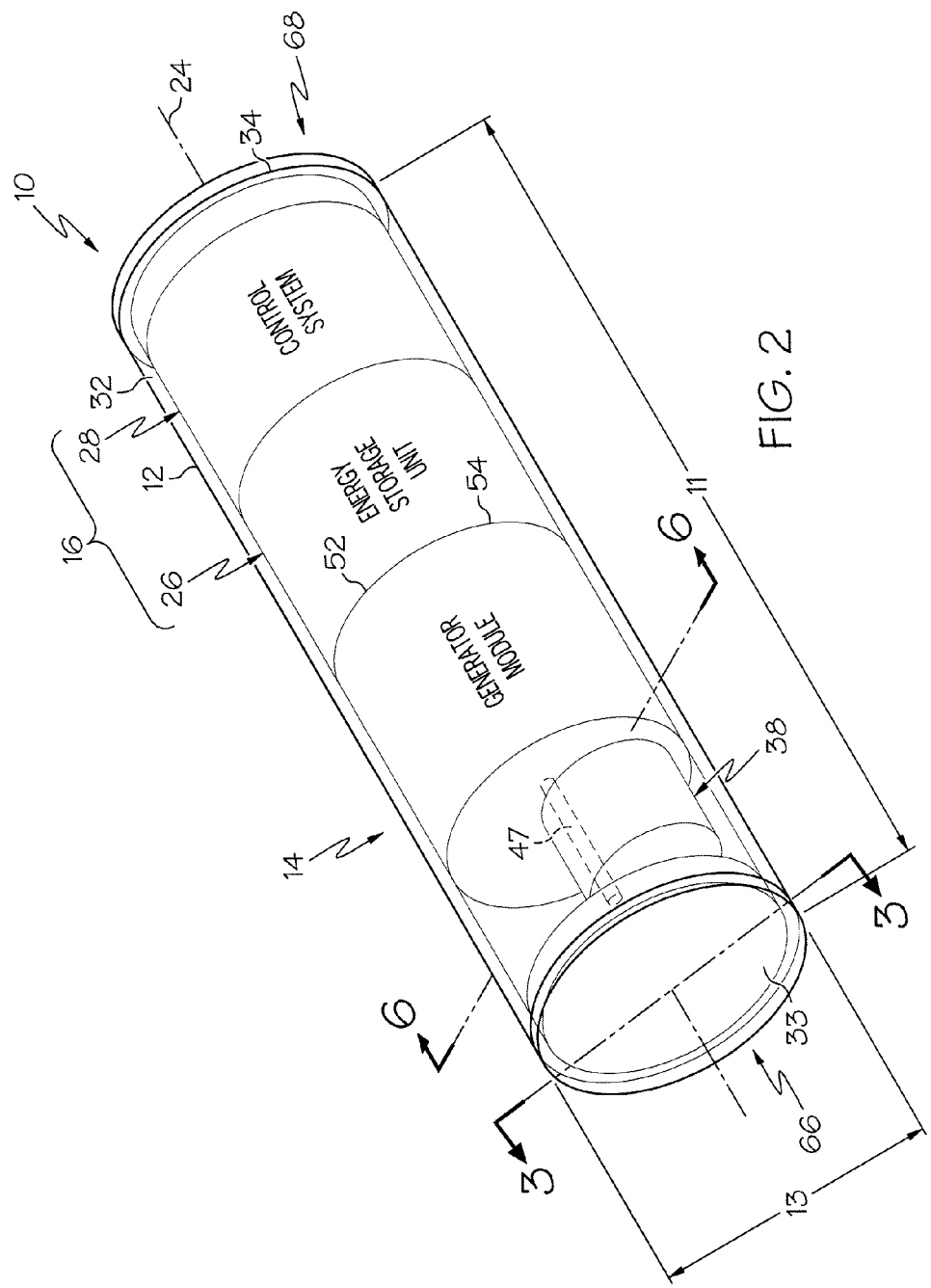
FIG. 2 is a perspective view of the modular power source of FIG. 1.
Figure 3:
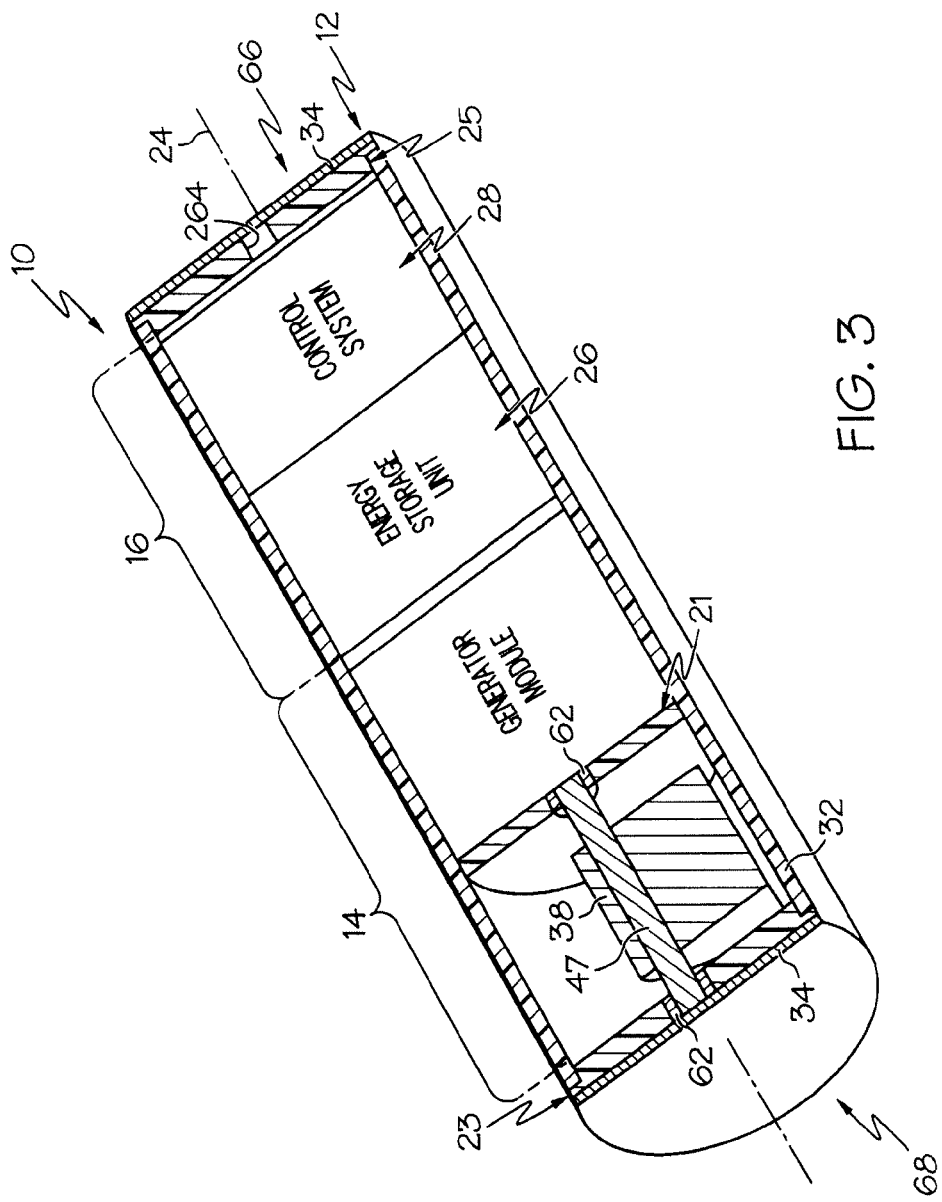
FIG. 3 is a sectional view taken along line 3-3 of FIG. 2 showing that the modular power source includes, from left to right, a weight, a generator module, and a control module including a control system and an energy storage unit.
Figure 4:
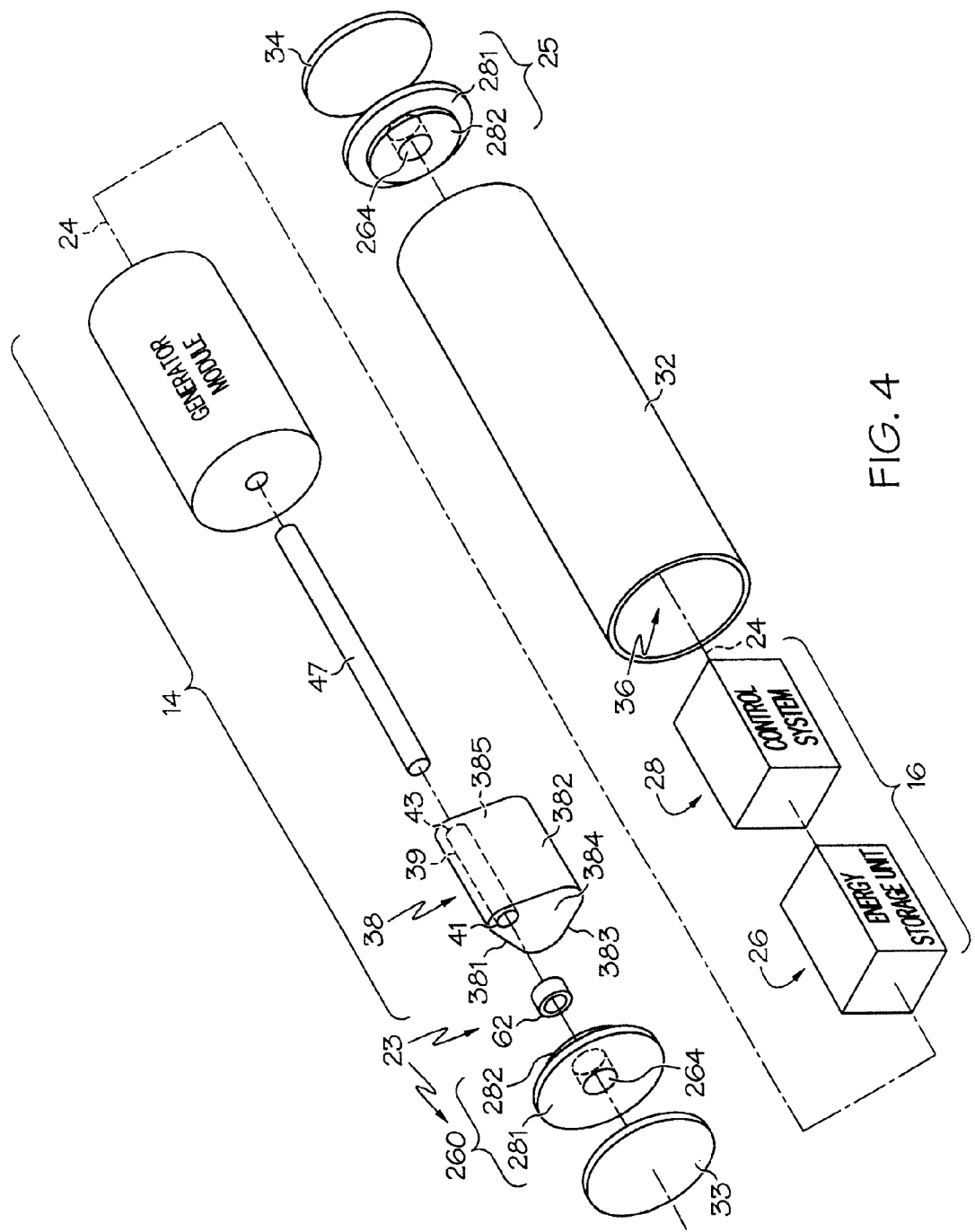
FIG. 4 is an exploded perspective view of the modular power source of FIGS. 2 and 3 showing that the modular power source includes, from left to right, a first conductor cap, a housing support including a cap and a bushing, the weight, a first end post, the generator module, the energy storage unit, the control system, an outer housing, a housing cap, and a second conductor cap.

Modular power source 10, as well as modular power source 110 described in detail below, operates by converting the kinetic energy of the rotating apparatus into electrical energy useable by an electrical component, illustratively position transmitter 30. Modular power source 10 includes an outer housing 12, a generator module 14, and a control module 16, as shown in FIGS. 2-4. Illustratively, as noted above, the modular power source 10, as well as the modular power source 110, is hand-held, or hand-holdable, such that it is sized and configured to be able to be held in one's hand when not in use. In particular, the modular power source 10 has an overall length 11 approximately 4 inches and a diameter 13 of approximately 1 inch. Accordingly, the modular power source 10 of the present disclosure is relatively compact, miniature, and able to be held in one's hand when not in use. While the illustrative length 11 and diameter 13 of the modular power source 10 is provided, it should be understood that the modular power source 10 may include other suitable length and diameter dimensions as well while still maintaining the ability to be able to be hand-held when not in use, thus providing a relatively compact modular power source. For example, the length 11 of the modular power source 10 may be anywhere between approximately 4-8 inches while the diameter may be anywhere between approximately 1-2 inches. It should further be understood that such dimensions are not to be read into the meaning of the term hand-held, or hand-holdable, but that such terms simply convey that the modular power sources 10, 110 disclosed herein are generally capable of being held in one's hand when not in use.

Looking again to FIGS. 2 and 3 of the modular power source 10, generator module 14 and control module 16 are electrically coupled to one another. As such, generator module 14 includes a weight 38 that allows the conversion of rotational kinetic energy into electrical energy as an output to control module 16. Control module 16 receives the electrical energy from generator module 14 and conditions and stores the energy for use by position transmitter 30.

Generator module 14, as illustrated in FIG. 7, includes a Gravity-Positioned Stator 18 (GPS 18), a relative rotor 20, and first and second supports 21, 22. As shown in FIG. 7, relative rotor 20 has an interior stator space 58 that is configured to receive GPS 18 therein. As is discussed below, in use, relative rotor 20 rotates about a central axis 24 which extends along the length of modular power source 10 during rotation of boring head 102.

GPS 18 is coupled on one end to first support 21 and is coupled on the opposite end to second support 22 such that first and second supports 21, 22 are able to freely rotate about central axis 24 relative to GPS 18. As an example, GPS 18 remains stationary relative to rotating first and second supports 21, 22. GPS 18 remains relatively stationary because it includes a weight 38, as suggested in FIGS. 2-4 and 7.

Generator module 14 provides electrical energy as a result of GPS 18 remaining stationary as relative rotor 20 rotates around GPS 18. Relative rotor 20 illustratively includes a rotor tube 86 and a magnetic sleeve 40 as shown in FIG. 7. Magnetic sleeve 40 is coupled to rotor tube 86 to move therewith and is configured to establish a magnetic field in the area of GPS 18. GPS 18 illustratively includes weight 38, a winding bobbin 52, and a coil 54 wrapped around winding bobbin 52 as illustrated in FIG. 7.

Illustratively, coil 54 is wound around winding bobbin 52 along the length of winding bobbin 52 as shown in FIGS. 7 and 8. As an example, coil 54 is made of copper wire, but may be made from any suitable alternative material. Electrons are induced to flow within coil 54 of GPS 18 as coil 54 moves through the magnetic field provided by magnetic sleeve 40 of relative rotor 20. The electrons flow from coil 54 to control module 16 for conditioning and storage for use by position transmitter 30.

Winding bobbin 52, as shown in FIGS. 7 and 8, includes tubular shaped body and three winding struts rigidly coupled to the body and spaced equidistantly from each other around the circumference of the body. Each winding strut includes an outwardly extending plate and a curved pad coupled to a distal end of the plate. A winding space is defined between each pair of adjacent winding struts and coil 54 is positioned in the winding spaces. As an example, coil 54 includes a series of individual strands of wire wrapped around each winding strut so that the winding strut is encircled multiple times by the wire of coil 54 as suggested in FIG. 8.

Figure 5A:
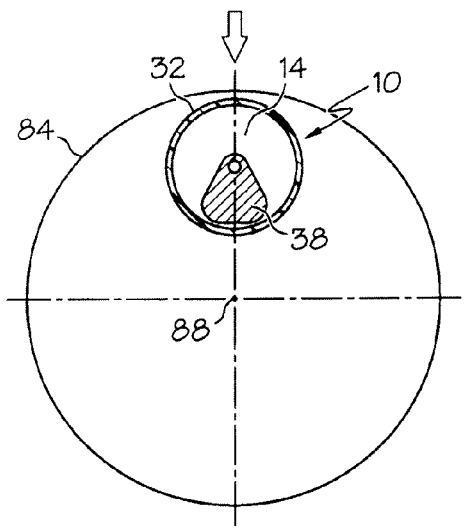
FIGS. 5a-5c are a series of sectional views taken along line 5-5 of FIG. 1 showing the relative position of the modular power source's components relative to the boring string during rotation of the boring string in a clockwise direction about a boring axis.
Figure 5B:
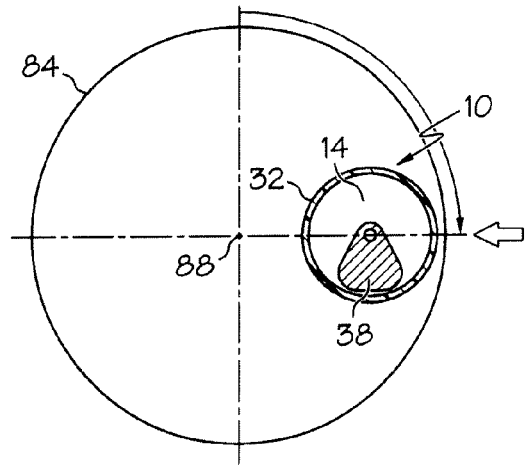
Figure 5C:
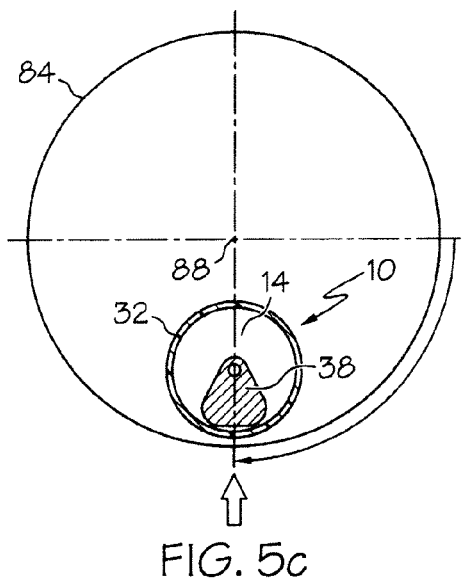
Figure 6:
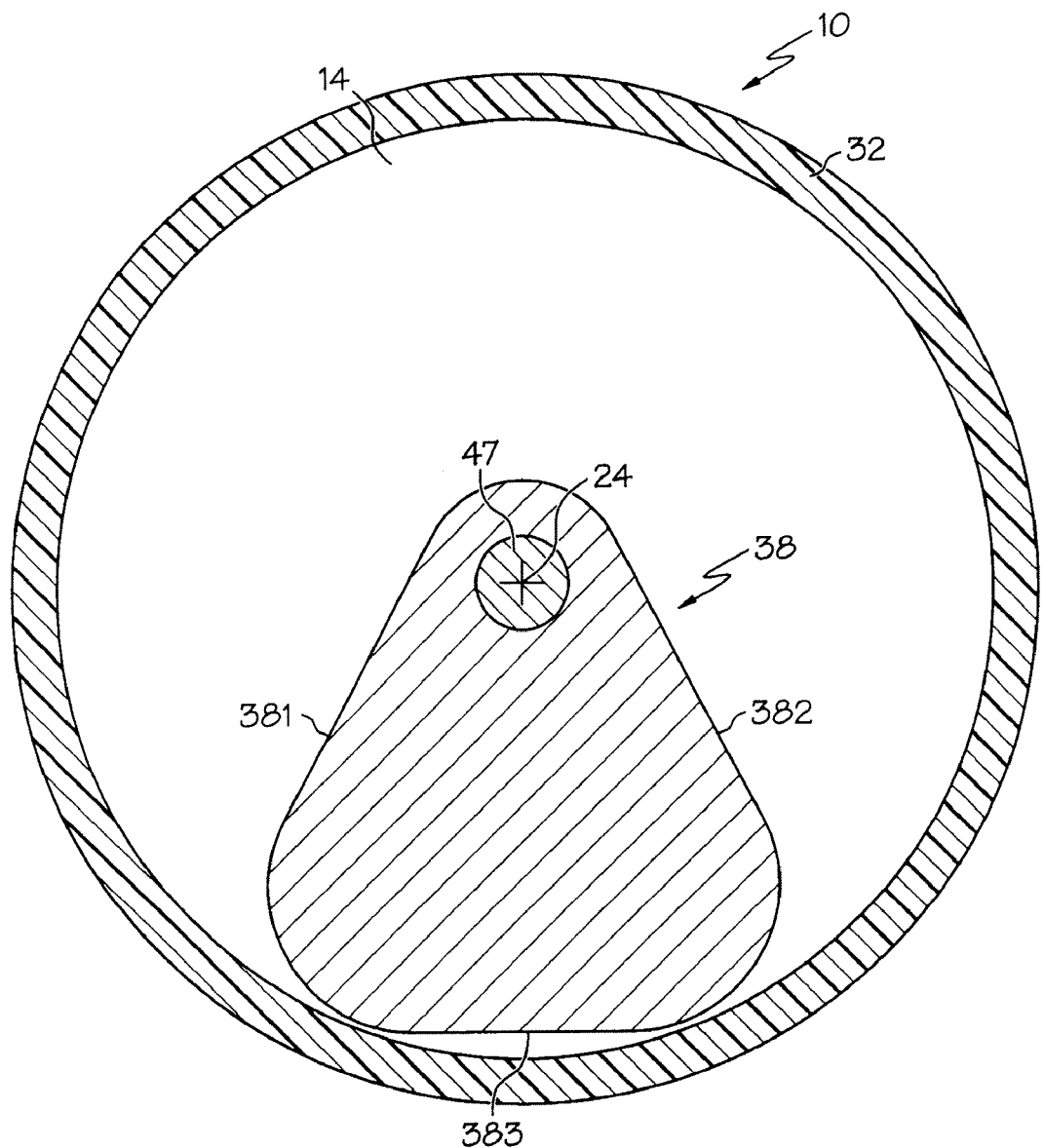
FIG. 6 is a sectional view of the modular power source taken along line 6-6 of FIG. 2 showing the weight remaining rotationally stationary during rotation of the boring string.

Weight 38 is coupled to winding bobbin 52 and coil 54 to cause GPS 18 to remain stationary relative to supports 21, 22 and relative rotor 20 as shown in FIGS. 2-4. As an example, weight 38 has a cross-section that is generally triangular in shape as shown in FIGS. 5a-6. As illustrated in FIGS. 4 and 6, weight 38 includes a first side 381, a second side 382, and a third side 383 that all cooperate to establish the generally triangular cross-section of weight 38. Central axis 24 extends through weight 38 near the intersection of first side 381 and second side 382 such that the center of gravity of weight 38 is spaced-apart from and below central axis 24. Because the center of gravity of weight 38 is not aligned with central axis 24, weight 38 remains generally stationary and does not rotate about central axis 24 when boring head 102 is rotating. Accordingly, because winding bobbin 52 and coil 54 are rigidly coupled to weight 38 by a first end post 47, resulting GPS 18 also remains generally stationary and does not rotate about central axis 24.

As shown in FIG. 4, weight 38 further includes a front surface 384 arranged to face toward first housing cap 23 and an opposite rear surface 385 arranged to face toward control module 16 and a passageway 39 extending between front surface 384 and rear surface 385. Front surface 384 is formed to include a first aperture 41 configured to open into passageway 39. Rear surface 385 is formed to include a second aperture 43 configured to open into passageway 39. As suggested in FIG. 4, first post 47 is arranged to extend through first and second apertures 41, 43 and lie in passageway 39.

Illustratively, while weight 38 is generally triangular in cross-sectional shape, it is within the scope of this disclosure to include weights having other shapes whereby the center of gravity of the weight is generally spaced from central axis 24 of modular power source 10. For example, the weight may be generally cylindrical in nature and may include a groove formed along its length. The groove also causes the center of gravity of the weight to be positioned in spaced-apart relation to central axis 24 (or the center line of GPS 18). As noted above, the offset center of gravity causes GPS 18 to remain generally stationary during rotational operation of the boring head 102 such that GPS 18 does not rotate about central axis 24. As an example, weight 38 includes a tungsten material. However, any other suitable alternative materials may be used. Weight 38 also has a mass of about 14 ounces, but any other suitable amount of mass may be used.

GPS 18 includes weight 38, winding bobbin 52, coil 54, and first and second end posts 47, 48 as shown in FIG. 7. Illustratively, first end post 47 is coupled to winding bobbin 52 and is arranged to extend away from winding bobbin 52 through first support 21 and through weight 38 to mate with a first housing support 23 included in outer housing 12. Second end post 48 is substantially the same as first end post 47 and is appended to the opposite end of winding bobbin 52 and is configured to extend toward second support 22. First and second end posts 47, 48 are aligned along central axis 24 and cooperate with first and second supports 21, 22 and first housing support 23 so that GPS 18 may remain substantially stationary relative to supports 21, 22. In other words, end posts 47, 48 remain generally stationary as well.

As discussed previously, generator module 14 includes first and second supports 21, 22 that cooperate with first housing support 23 as suggested in FIGS. 4 and 7. First support 21 is substantially the same as second support 22 and first housing support 23, as such, only first support 21 will be discussed in detail. First support 21 includes a cap 60 and a bushing 62. Cap 60 includes a first disk 81 and a second disk 82 coupled to a side of first disk 81 that is arranged to face toward winding bobbin 52. Illustratively, first disk 81 has a first diameter and second disk 82 has a second diameter smaller than the first diameter.

Disks 81, 82 are formed to include a support aperture 64 sized to receive bushing 62 therein. Bushing 62 is coupled to cap 60 and is positioned to lie within support aperture 64. Bushing 62 cooperates with first end post 47 of GPS 18 to allow first support 21 to freely rotate relative to weight 38 and GPS 18. Similarly, second support 22 also freely rotates relative to weight 38 and GPS 18 in response to rotation of the rotating device i.e., boring head 102, of which modular power source 10 is coupled.

Relative rotor 20, as illustrated in FIG. 7, includes magnetic sleeve 40 and rotor tube 86. Magnetic sleeve 40, as suggested in FIG. 7, is established by coupling two half sleeves 42, 44 together. Rotor tube 86 is positioned to lie between each half sleeve 42, 44 such that half sleeves 42, 44 cooperate to encircle the perimeter of rotor tube 86. As suggested in FIG. 7, magnetic sleeve 40 has a cross-section that is tubular in shape. Magnetic sleeve 40 is configured to have an interior diameter which is approximately equal to the outer diameter of rotor tube 86 such that rotor tube 86 may be press fit between each half sleeve 42, 44 of magnetic sleeve 40. As such, in use, GPS 18 remains stationary while magnetic sleeve 40 and rotor tube 86 rotate together around to GPS 18.

Rotor tube 86 is formed to include a first tube aperture 69 (shown in FIG. 7), a second tube aperture 70, and an interior stator space 58. First and second tube apertures 69, 70 open into interior stator space 58 such that GPS 18 is positioned substantially in interior stator space 58. Rotor tube 86 is made from a non-conductive material, for example plastic, so as to block movement of electricity generated in coil 54 of GPS 18 during operation of modular power source 10.

Electrically generated by generator module 14 flows from generator module 14 to control module 16 for conditioning and storage for use by the electrical device. As shown in FIGS. 2-4 and 9, illustrative control module 16 includes an energy storage unit 26 and a control system 28. Energy storage unit 26 operates to receive the electrical energy from generator module 14, condition the electrical energy so that it may be used by position transmitter 30, and store the electrical energy after conditioning for future use. Control system 28 operates to send the conditioned electrical energy to position transmitter 30 when operating conditions call for position transmitter 30 to be supplied with electrical energy.

Figure 9:
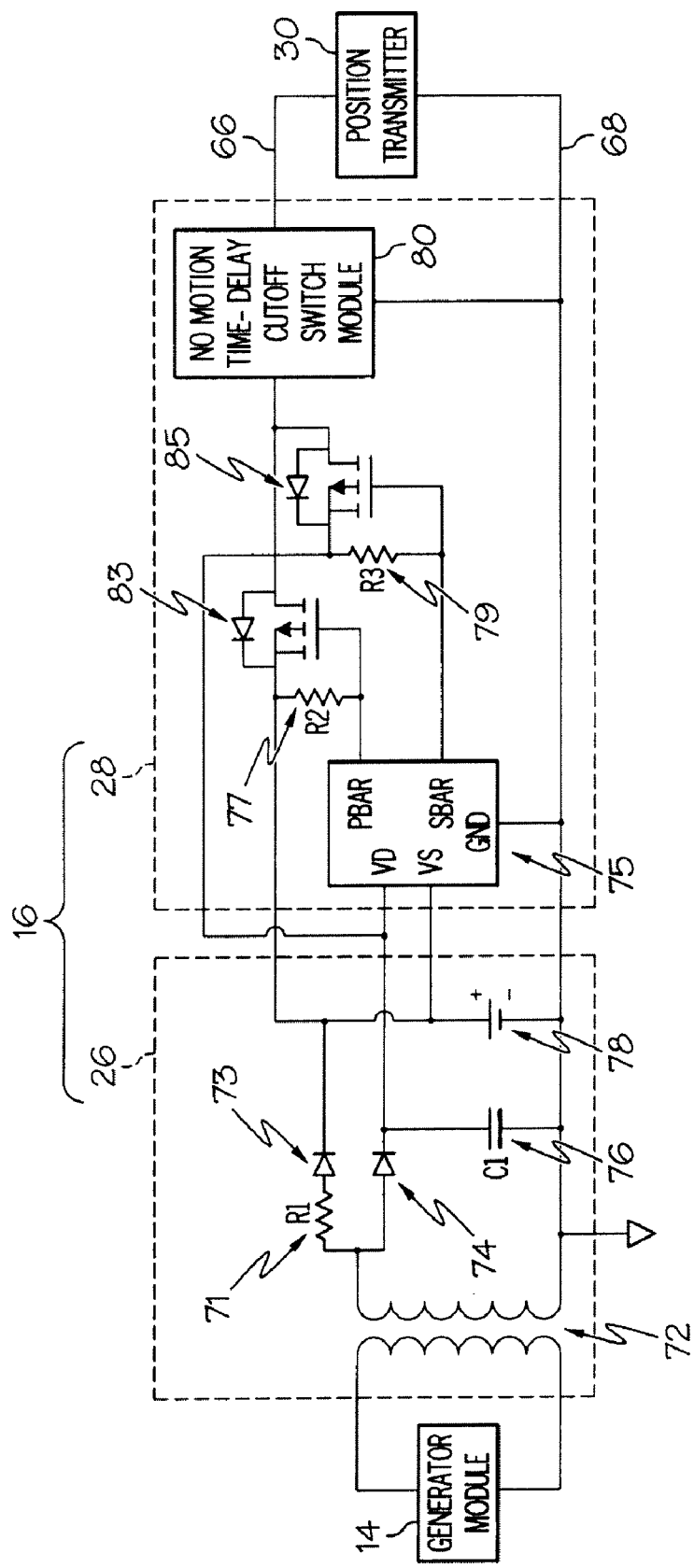
FIG. 9 is a diagrammatic view of the control module showing that the control module is coupled electrically to the generator module and that the control module includes an energy storage unit and a control system.
Figure 10:
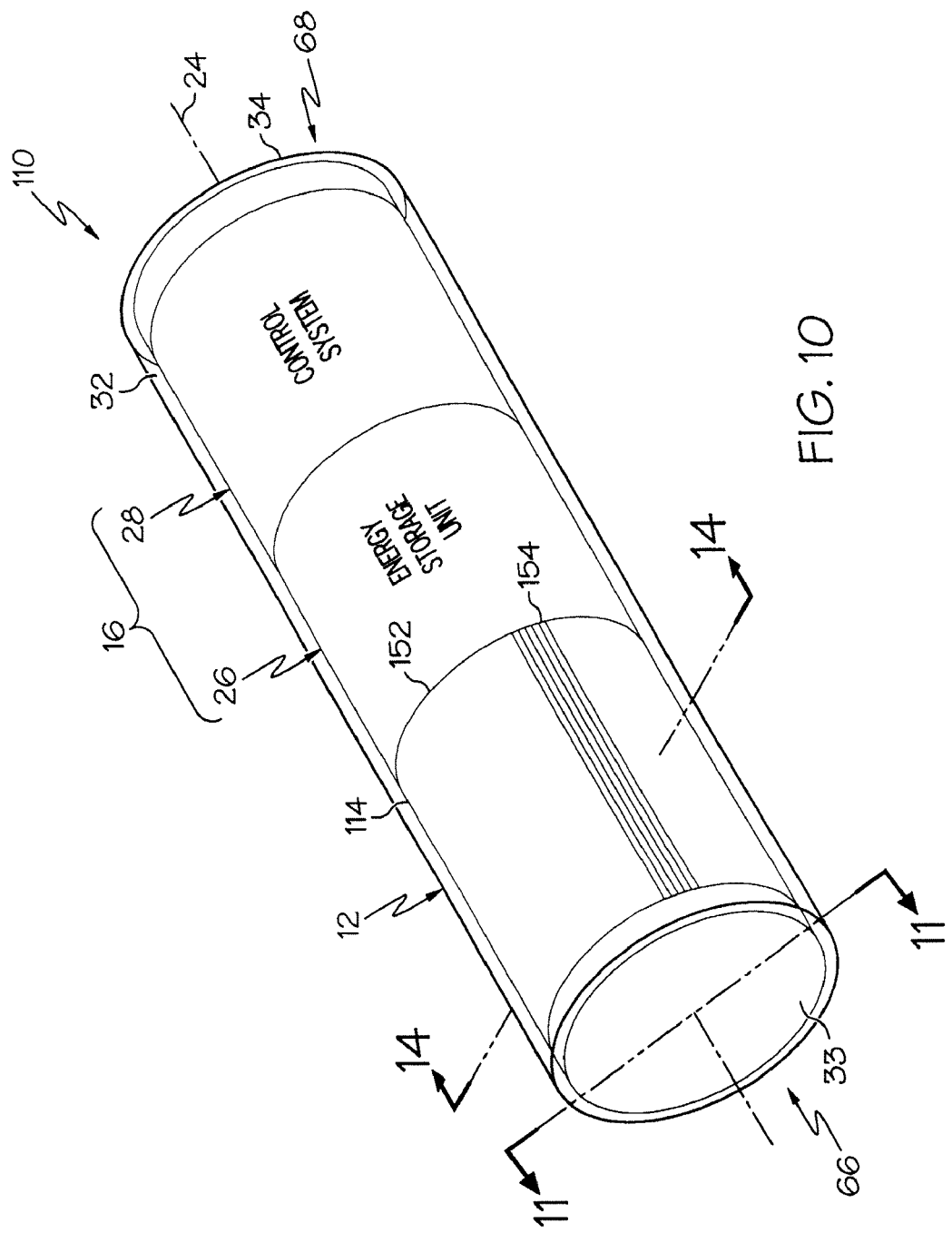
FIG. 10 is a perspective view of a modular power source.

As shown in FIG. 9, energy storage unit 26 includes a voltage transformer 72, a first resistor 71, a first AC-to-DC rectifier 73, a second AC-to-DC rectifier 74, a capacitor 76, and a rechargeable battery 78. As an example, electrical energy coming from generator module 14 may be at a low voltage, flowing as an AC current, and the AC voltage may be fluctuating. Voltage transformer 72 is electrically coupled to leads of generator module 14 and is used to step up the low voltage to a higher voltage. As an example, voltage transformer 72 is a BOURNS® brand PM600 transformer, but any other suitable alternative transformer may be used.

The higher voltage electricity provided by voltage transformer 72 is then conditioned in series by first resistor 71 and first AC-to-DC rectifier 73 when the electrical energy is flowing to rechargeable battery 78. As is discussed in greater detail below, when the electricity is flowing to position transmitter 30 without going through battery 78, the electricity is conditioned in by second AC-to-DC rectifier 74 and capacitor 76. AC-to-DC rectifiers 73, 74 are used to covert the AC current of the electrical energy into DC current. AC-to-DC rectifiers 73, 74 are a CHENG-YI Electronic rectifier, model IN5819, but any other suitable alternative rectifiers may be used. Capacitor 76 conditions the electrical energy by smoothing the fluctuating voltage so that the discharge voltage is generally stable for use by position transmitter 30. Illustratively, first resistor 71 is a resistor of about 1,000 ohms and capacitor 76 is a capacitor of about one micro farad, but any other suitable alternatives may be used. Thus, energy storage unit 26 may provide two positive electrical leads to control system 28, one from rechargeable battery 78 and one direct from generator module 14.

Rechargeable battery 78 is, for example, a lithium-ion battery having a good recharge rate and the capability for multiple discharge-recharge cycles. In another embodiment, the rechargeable battery may be nickel-cadmium batteries or any other suitable alternative. As shown in FIG. 9, a 3.7 Volt, 170 mAmp lithium-ion battery is used to provide sufficient voltage to position transmitter 30. Alternatively, any number of batteries could be used and arranged to provide sufficient voltage to position transmitter 30.

Control system 28 illustratively includes an automatic battery back-up switch 75, a second resistor 77, a third resistor 79, a first MOSFET switch 83, a second MOSFET switch 85, and No-Motion Time-Delay Cutoff Switch Module 80 (NMTDCS Module 80) as suggested in FIG. 9. In use, automatic battery back-up switch 75 is used switch between sources of electricity. Automatic battery back-up switch 75 does this by comparing the input voltage provided by rechargeable battery 78 and the input voltage received directly from generator module 14 and then allowing electricity from the higher voltage source to pass through to NMTDCS Module 80. NMTDCS Module 80 is used to conserve electricity stored in rechargeable battery 78 by blocking the flow of electricity to position transmitter 30 when boring head 102 is not rotating.

Automatic battery back-up switch 75 includes two inputs VP (Voltage Primary) and VS (Voltage Secondary) and two outputs PBAR (Primary Output) and SBAR (Secondary Output). As an example, input VP is electrically coupled the output of second AC-to-DC rectifier 74. Input VS is electrically coupled to rechargeable battery 78. PBAR is the primary electrical output that corresponds to the electrical energy provided through VP and is electrically coupled to second resistor 77 and first transistor 83 and the output of transistor 83 is electrically coupled to NMTDCS Module 80. SBAR is the secondary electrical output that corresponds to the electrical energy provided through VS and is electrically coupled to third resistor 79 and second transistor 85 and the output of transistor 83 is electrically coupled NMTDCS Module 80.

As an example, automatic battery back-up switch 75 is an INTERSIL® brand automatic battery back-up switch having model number ICL7673, but any other suitable alternative may be used. In addition, second and third illustrative resistors 77, 79 are resistors of about 4,700 ohms each, but any other suitable alternatives may be used. Finally, first and second transistors 83, 85 are illustratively a DIODES™ Incorporated transistors having model number ZXM61P03FTA, but any other suitable alternative transistors may be used.

NMTDCS Module 80 operates by sensing whether boring head 102 is rotating or stationary. If boring head 102 is rotating, then NMTDCS Module 80 permits electrical energy to flow from automatic battery back-up switch 75 to position transmitter 30. If boring head 102 is not rotating, then NMTDCS Module 80 senses the lack of motion and blocks electrical energy from flowing to position transmitter 30. NMTDCS Module 80 thereby allows rechargeable battery 78 to conserve power when boring head 102 is not moving and therefore not needing position transmitter 30 to emit radio signal 104. NMTDCS Module 80 may also be configured to allow electrical energy to flow from automatic battery back-up switch 75 to position transmitter 30 for a time period after boring head 102 stops moving so that the position of boring head 102 may be detected during the time period after boring head 102 has become stationary.

Generator module 14 and control module 16 are positioned to lie in outer housing 12. As shown in FIGS. 3 and 4, outer housing 12 includes a cover tube 32, a first conductor cap 33, a second conductor cap 34, a housing support 23, and a housing cap 25. Cover tube 32, first conductor cap 33, and second conductor cap 34 cooperate to define a module space 36 therebetween. Generator module 14 and control module 16 are positioned in module space 36. Outer housing 12 operates to protect generator module 14 and control module 16 from dirt, water, or any other substance in the environment which may inhibit or deteriorate the functioning of modular power source 10.

In addition, a hot-melt glue may be added around control module 16 in module space 36 to minimize vibration and shock transferred from boring head 102 to control module 16. The hot-melt glue also is used to further protect control module 16 from dirt, water, moisture, or any other substance which may damage the functioning of control module 16. Hot-melt glue is illustratively HM6113PE Hot Melt Fugitive Glue 275-350 degree F. provided by Capital Adhesives of Mooresville, Ind., but may be any other suitable alternative.

Housing support 23 of outer housing 12 includes a cap 260 and a bushing 62. Cap 260 includes a first disk 281 and a second disk 282 that is coupled to a side of first disk 281 that is arranged to face toward weight 38. Illustratively, first disk 281 has a first diameter and second disk 282 has a second diameter smaller than the first diameter. Disks 281, 282 are formed to include a support aperture 264 sized to receive bushing 62 therein. Bushing 62 is coupled to cap 260 and is positioned to lie in support aperture 264. Bushing 62 cooperates with first end post 47 of GPS 18 to allow housing support 23 to rotate freely relative to weight 38 and GPS 18.

Housing cap 25 illustratively includes first disk 281 and second disk 282 that is coupled to a side of first disk 281 that is arranged to face toward weight 38. Illustratively, first disk 281 has a first diameter and second disk 282 has a second diameter smaller than the first diameter. Disks 281, 282 are formed to include an aperture 264 which may be configured to receive wires therein that operate to electrically interconnect second conductor cap 34 and control system 28.

Illustratively, outer housing 12 is a hollow cylinder made of impact and water resistant plastic. However, it is within the scope of this disclosure to include outer housings having other suitable shapes and made of other suitable materials. First conductor cap 33 is coupled to housing support 23 and second conductor cap 34 is coupled to the housing cap 25. First and second conductor caps 34 are electrically coupled to terminals 66, 68 of control module 16. As an example, first conductor cap 33 is coupled to positive terminal 66 and second conductor cap 34 is coupled to negative terminal 68 within cover tube 32. As such, position transmitter 30 is electrically coupled to first and second conductor caps 33, 34 so that electricity may flow to position transmitter 30.

Illustratively, horizontal boring rig 100 includes a boring-string driver 108, a drill string 84, and boring head 102. Boring head 102 is interconnected to boring-string driver 108 by drill string 84. Boring-string driver 108 applies a drive torque 112 to drill string 84 to cause drill string 84 and boring head 102 to rotate, for example, in a clockwise direction about boring axis 88 as illustrated in FIG. 1.

Illustratively, modular power source 10 is used in horizontal boring rig 100 to power position transmitter 30 positioned near boring head 102 of the boring rig 100. In use, position transmitter 30 emits a radio signal 104 which is picked up and read by a position-transmitter receiver 106. As shown in FIG.

1, operator 90 reads position-transmitter receiver 106 to determine the position of boring head 102 during underground boring.

As shown illustratively in FIG. 1, modular power source 10 is positioned to lie within boring head 102 that is coupled to drill string 84 of boring rig 100. Drill string 84 is arranged to rotate about boring axis 88 as illustrated in FIGS. 5a-5c. Boring axis 88 is positioned to lie in spaced-apart relation to central axis 24 of modular power source 10. Alternatively, modular power source 10 may be positioned within boring head 102 such that central axis 24 is aligned in collinear relation with boring axis 88. As drill string 84 rotates about boring axis 88 in the clockwise direction, magnetic sleeve 40 rotates about central axis 24 while GPS 18 remains generally rotationally stationary in the gravity-oriented position. In other words, GPS 18 does not rotate relative to central axis 24 during operation of modular power source 10 because weight 38, which is rigidly coupled winding bobbin 52, has a center of gravity that is offset or spaced-apart from central axis 24 of modular power source 10. As such, the effect of gravity on the offset center of gravity of weight 38 generally prevents weight 38, and entire GPS 18 including winding bobbin 52, coil 54, and first and second end posts 47, from rotating about central axis 24.

For example, FIG. 5a shows drill string 84, outer housing 12, and weight 38 all at 0 degrees of rotation. Illustratively, supports 21, 22 of GPS 18, relative rotor 20, and outer housing 12 are coupled together to move together with drill string 84 as suggested in FIGS. 5b and 5c. FIG. 5b shows that drill string 84 has rotated 90 degrees and that the outer housing 12 (interconnected with relative rotor 20) has rotated 90 degrees while weight 38 (interconnected with GPS 18) has remained at 0 degrees of rotation relative to relative rotor 20. FIG. 5c illustrates that continued rotation of drill string 84 to 180 degrees of rotation causes outer housing 12 (and relative rotor 20) to rotate to 180 degrees of rotation while weight 38 (and GPS 18) remain at 0 degrees of rotation with respect to relative rotor 20.

As suggested in FIGS. 5a-5c, weight 38 causes GPS 18 to remain stationary relative to boring head 102 and relative rotor 20 during rotation of boring head 102. Magnetic sleeve 40 included in relative rotor 20 provides a moving magnetic field. As boring head 102 and relative rotor 20 rotate, the magnetic field provided by magnetic sleeve 40 moves around coil 54 of GPS 18. Electrons are induced to flow from coil 54 to control module 16 as the magnetic field of magnetic sleeve 40 moves around coil 54.

After drill string 84 has stopped rotating, GPS 18 may begin rotating relative to the now stationary relative rotor 20 as a result of rotational inertia remaining within GPS 18 after drill string 84 has stopped rotating. This additional continued rotation may further generate electricity in order to provide additional charging of energy storage unit 26.

The use of modular power source 10 in horizontal boring rig 100 allows position transmitter 30 to be powered continually without the need to stop boring to change dead or weak batteries used to power position transmitter 30. As such, modular power source 10 converts the rotational kinetic energy of drill string 84 into electrical energy as the drill string 84 is being used as well as in the time immediately after drill string 84 has stopped rotating. As such, downtime due to weak or dead batteries may be minimized because modular power source 10 is recharged constantly by the rotation of drill string 84.

Figure 11:
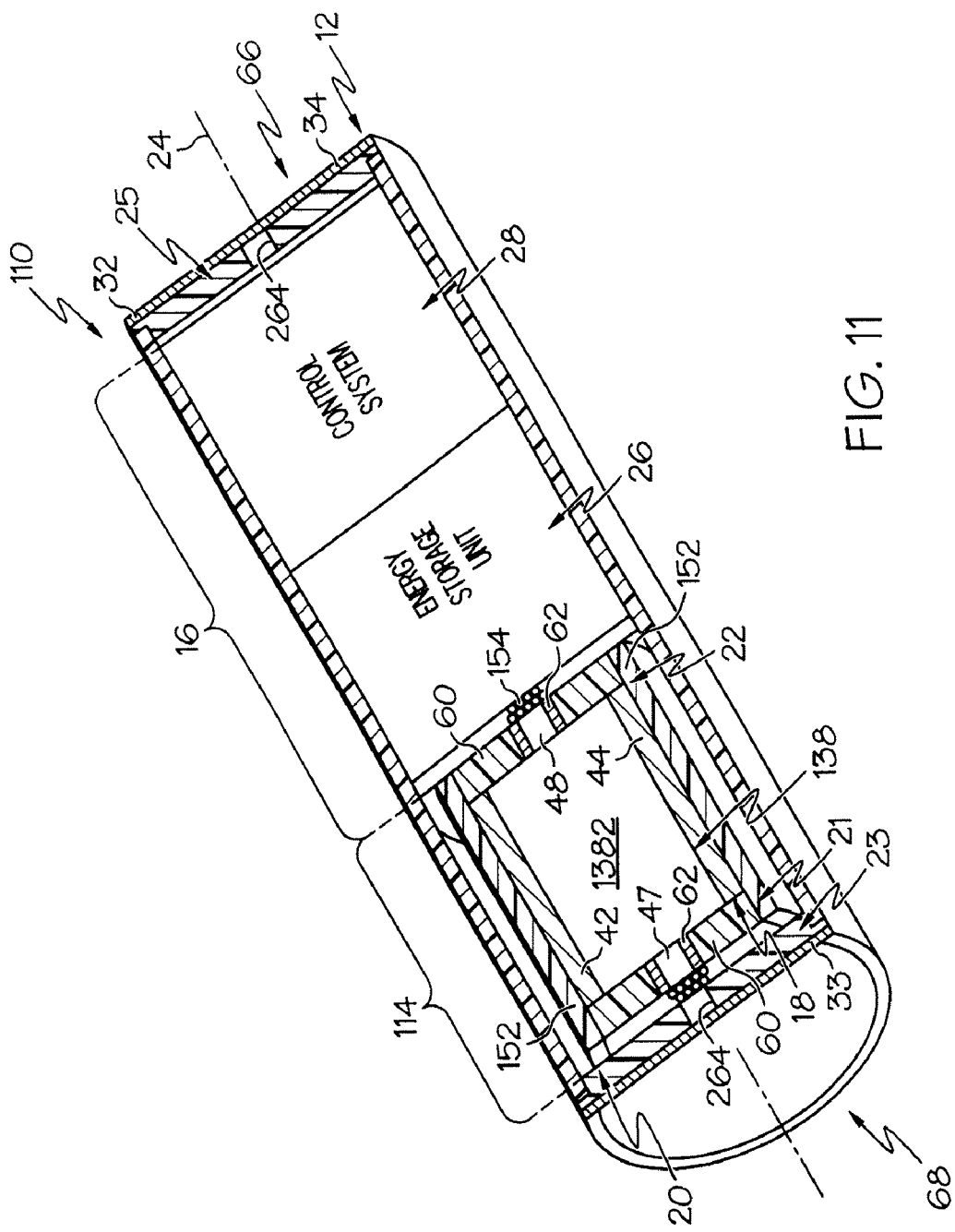
FIG. 11 is a sectional view taken along line 11-11 of FIG. 10 showing that the modular power source includes a generator module and a control module including a control system and an energy storage unit.
Figure 12:
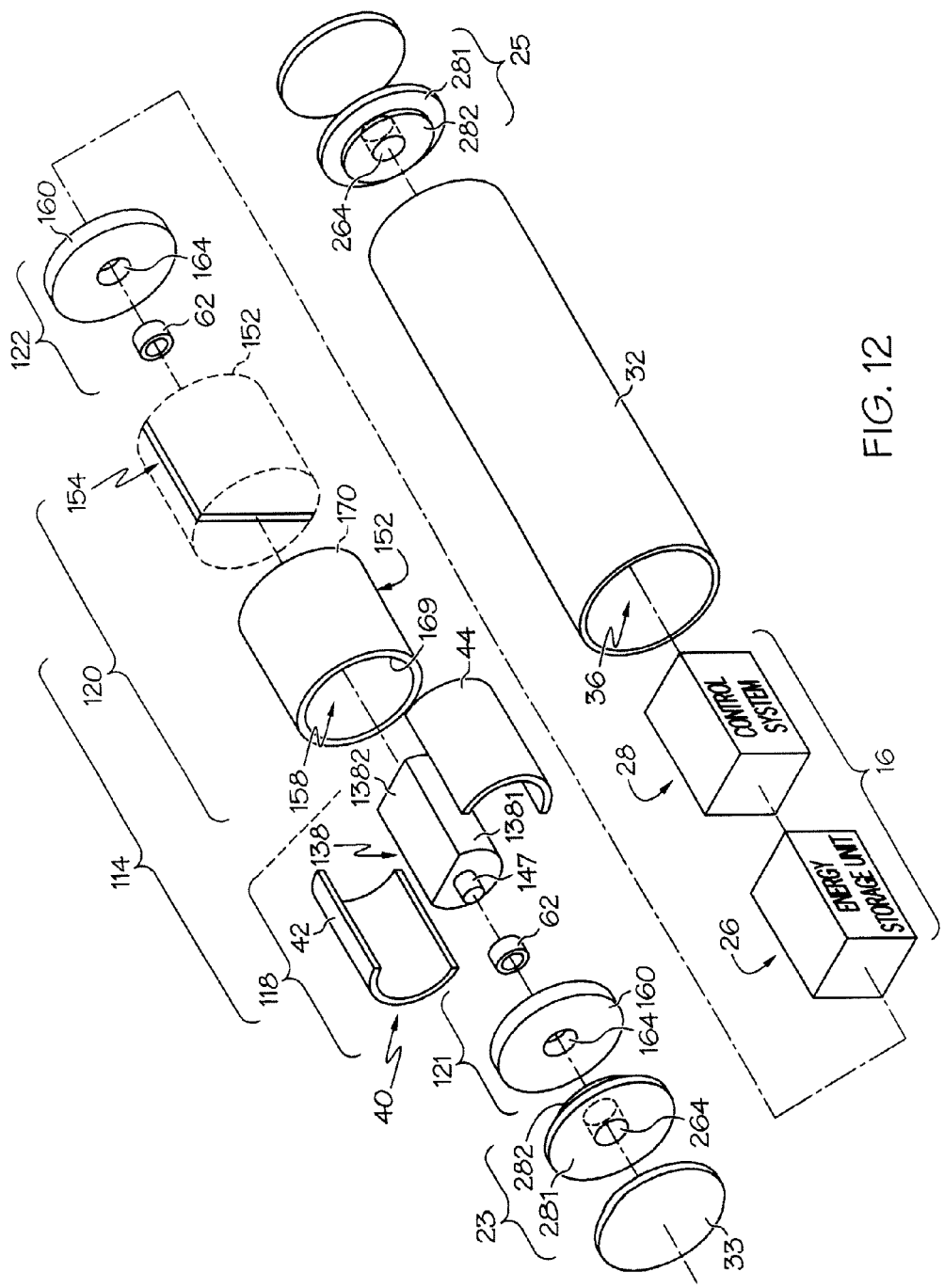
FIG. 12 is an exploded perspective view of the modular power source of FIGS. 10 and 11 showing that the modular power source includes, from left to right, a first conductor cap, a first housing cap, a first half sleeve and a second half sleeve with a weighted core in between, a winding tube, a coil wrapped around the winding tube (shown in phantom), a second support, the energy storage unit, the control system, an outer housing, and a second conductor cap.

Another modular power source 110, as shown in FIGS. 10-14, may also be used illustratively to power position transmitter 30 mounted on boring head 102 of boring rig 100. Similar to modular power source 10, modular power source 110 includes an outer housing 12, a generator module 114, and a control module 16 as shown in FIG. 12. Generator module 114 and control module 16 are electrically coupled to each other. As such, generator module 114 converts rotational kinetic energy of boring head 102 into electrical energy as an output to control module 16. Control module 16 receives the electrical energy and conditions and stores the energy for use by position transmitter 30.

Generator module 114, as illustrated in FIGS. 11 and 12, includes a Gravity-Positioned Stator 118 (GPS 118), a relative rotor 120, and first and second supports 121, 122. As shown in FIG. 12, relative rotor 120 has an interior stator space 158 that is configured to receive GPS 118 therein. As is discussed below, in use, relative rotor 120 rotates about a central axis 24 which extends along the length of modular power source 110.

GPS 118 is coupled on one end to first support 121 and is coupled on the opposite end to second support 122 such that first and second supports 121, 122 are able to rotate about central axis 24 freely with respect to GPS 118. As an example, GPS 118 remains stationary relative to rotating first and second supports 121, 122. GPS 118 remains relatively stationary because it includes, as shown in FIG. 12, a weight, or weighted core 138, and a magnetic sleeve 40.

Generator module 114 provides electrical energy as a result of GPS 118 remaining stationary as relative rotor 120 rotates around GPS 118. Magnetic sleeve 40, included in GPS 118, establishes a magnetic field in the area of relative rotor 120 when relative rotor 120 and magnetic sleeve 40 rotate relative to each other. Electrons are induced to flow within a coil 154 included in relative rotor 120 as coil 154 moves through the magnetic field. The electrons flow from coil 154 to control module 16 for conditioning and storage for use by position transmitter 30.

Figure 14:
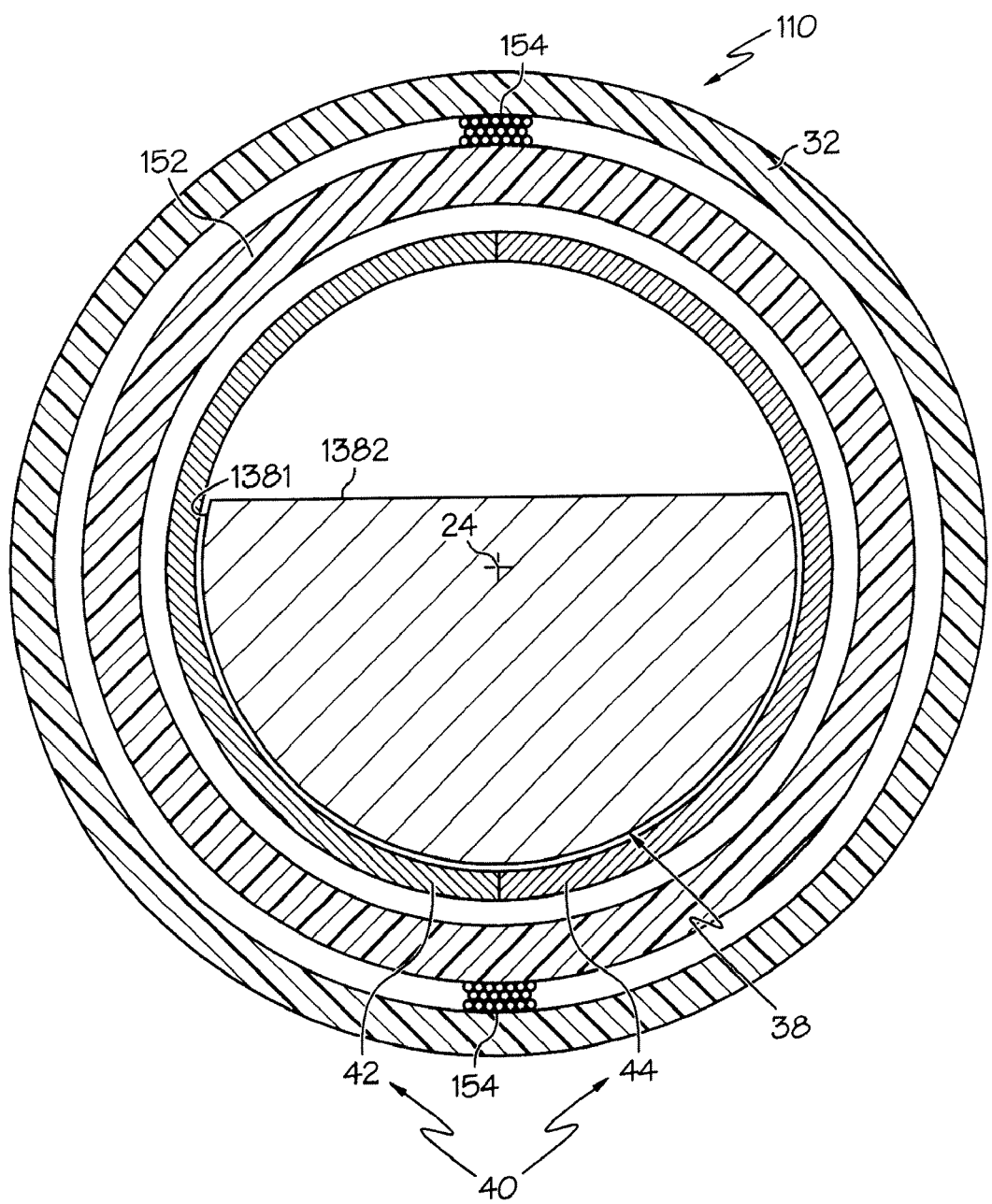
FIG. 14 is a sectional view of the modular power source taken along line 13-13 of FIG. 10 showing that the generator module of the modular power source includes, from the inside out, the gravity-positioned stator having the weighted core and the magnetic sleeve encircling the weighted core, and the relative rotor having the winding tube and the coil coupled to the winding tube and showing that the generator module is positioned to lie within an outer housing configured to house the generator module and the control module.

GPS 118 remains stationary because weighted core 138, as shown in FIGS. 11 and 12, has a cross-section that is generally frusto-circular in shape. As shown in FIGS. 12 and 14, the outer surface of weighted core 138 defines a first curved outer surface 1381 and a second flat outer surface 1382. Thus, the center of gravity of weighted core 138 and resulting GPS 118 is positioned to lie spaced-apart from and below central axis 24. Because the center of gravity of GPS 118 is not aligned with central axis 24, GPS 118 is biased into a position where second flat outer surface 1382 is arranged to face in an upward direction opposite the force of gravity.

Illustratively, while weighted core 138 is generally frusto-circular in cross-sectional shape, it is within the scope of this disclosure to include weighted cores having other shapes whereby the center of gravity of the weighted cored is generally spaced from central axis 24 of modular power source 110. For example, the weighted core may be generally cylindrical in nature and may include a groove formed along its length. The groove also causes the center of gravity of weighted core 138 and resulting GPS 118 to be positioned in spaced-apart relation to central axis 24. As noted above, the offset center of gravity causes GPS 118 to remain generally stationary such that GPS 118 does not rotate about central axis 24.

GPS 118 further includes a first end post 147 and a second end post 148 as shown in FIG. 12. Illustratively, first end post 147 is appended to weighted core 138 and arranged to extend away from weighted core 138 toward first support 121 to mate with first support 121. Second end post 148 is substantially the same as first end post 147 and is appended to the opposite end of weighted core 138 and configured to extend toward second support 122. First and second end posts 147, 148 are aligned along central axis 24 and cooperate with and are received in first and second supports 121, 122 so that GPS 118 may remain substantially stationary relative to first and second supports 121, 122.

Magnetic sleeve 40, as suggested in FIG. 12, is established by coupling two half sleeves 42, 44 together. Weighted cored 138 is positioned to lie between each half sleeve 42, 44 and half sleeves 42, 44 cooperate to encircle the perimeter of weighted core 138. As shown in FIG. 14, magnetic sleeve 40 has a cross-section that is tubular in shape. Magnetic sleeve 40 is configured to have an interior diameter which is approximately equal to the diameter of first curved outer surface 1381 of weighted core 138 such that weighted core 138 may be press fit between each half sleeve 42, 44 of magnetic sleeve 40. As such, in use, magnetic sleeve 40 remains stationary with weighted cored 138 as relative rotor 120 rotates relative thereto. As an example, weighted core 138 includes a tungsten material. However, any other suitable alternative may be used.

As discussed previously, GPS 118 includes first and second supports 121, 122 as suggested in FIG. 12. First support 121 is substantially the same as second support 122, as such, only first support 121 will be discussed in detail. First support 121 includes a cap 160 and a bushing 62. Cap 160 is formed to include a support aperture 164 sized to receive bushing 62 therein. Bushing 62 is coupled to cap 160 and is positioned to lie within support aperture 164. Bushing 62 cooperates with first end post 147 of GPS 118 to allow first support 121 to rotate freely relative to weighted core 138 and GPS 118. Similarly, second support 122 also rotates freely relative to weighted core 138 and GPS 118 in response to rotation of boring head 102 which modular power source 110 is coupled.

Relative rotor 120, as illustrated in FIG. 12, includes a winding tube 152 and a coil 154. Illustratively, coil 154 is wound around winding tube 152 along the length of winding tube 152. Alternatively, a plurality of separate loops of wire may be wound around the length of winding tube 152. Illustratively, the coil 154 is made of copper wire, but may be made from any suitable alternative material.

Winding tube 152 is formed to include a first tube aperture 169 (shown in FIG. 12), a second tube aperture 170, and an interior stator space 158. First and second tube apertures 169, 170 open into interior stator space 158 such that GPS 118 may lie within interior stator space 158. Winding tube 152 is made from a non-conductive material, for example plastic, so as to block movement of electricity generated in coil 154 from moving to GPS 118 during operation of modular power source 110.

Figure 13A:
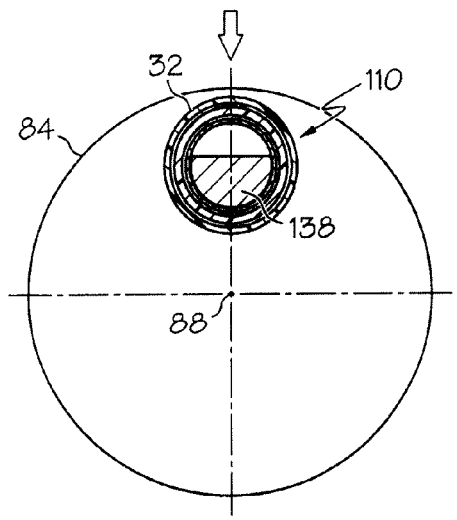
FIGS. 13a-13c are a series of sectional views similar to FIGS. 5a-5c showing the relative position of components of the modular power source of FIGS. 10-12 relative to the boring string during rotation of the boring string in a clockwise direction about a boring axis.
Figure 13B:
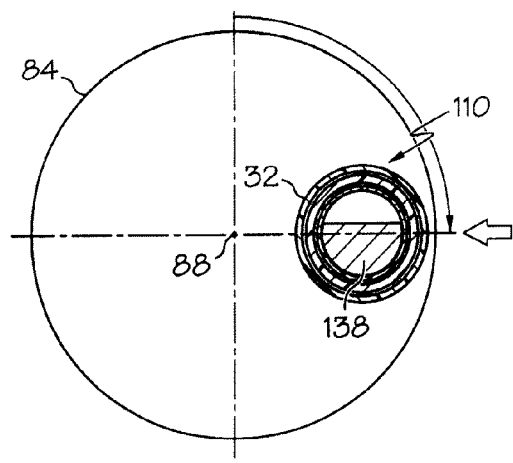
Figure 13C:
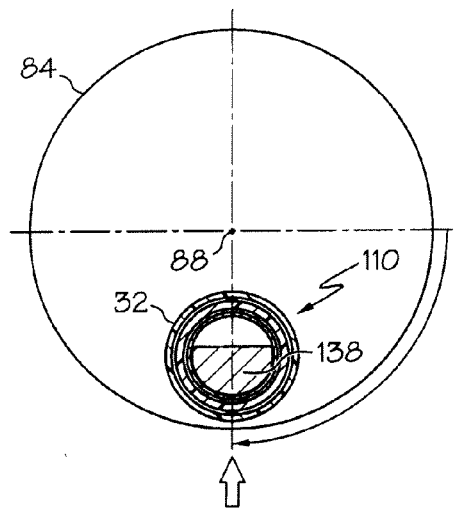

As suggested in FIG. 1, modular power source 110 is positioned to lie within boring head 102 coupled to drill string 84 of boring rig 100. Drill string 84 is arranged to rotate about boring axis 88 as illustrated in FIGS. 13a-13c. Illustratively, boring axis 88 is positioned to lie in spaced-apart relation to central axis 24. Alternatively, modular power source 110 may be positioned within boring head 102 such that central axis 24 is aligned in collinear relation with boring axis 88. As drill string 84 rotates about boring axis 88 in the clockwise direction, coil 154 rotates about central axis 24 while GPS 118 remains generally stationary in the gravity-oriented position. In other words, GPS 118 does not rotate relative to central axis 24 during operation of modular power source 110.

For example, FIG. 13a shows drill string 84, relative rotor 120, and GPS 118 all at 0 degrees of rotation. FIG. 13b shows that drill string 84 has rotated 90 degrees and that the relative rotor 120 has rotated 90 degrees while GPS 118 has remained at 0 degrees of rotation relative to relative rotor 120. FIG. 13c illustrates that continued rotation of drill string 84 to 180 degrees of rotation causes relative rotor 120 to rotate to 180 degrees of rotation while GPS 118 remains at 0 degrees of rotation with respect to relative rotor 120.

As shown in FIGS. 13a-13c, GPS 118 remains stationary relative to boring head 102 and relative rotor 120 during rotation of boring head 102. Magnetic sleeve 40 included in GPS 118 provides a stationary magnetic field. As boring head 102 and relative rotor 120 rotate, coil 154 of relative rotor 120 moves through the magnetic field produced by magnetic sleeve 40. Electrons are induced to flow from coil 154 to control module 16 as coil 154 moves through the stationary magnetic field.

After drill string 84 has stopped rotating, GPS 118 may begin rotating relative to the now stationary relative rotor 120 as a result of rotational inertia remaining within GPS 118 after drill string 84 has stopped rotating. This additional continued rotation may provide additional charging of energy storage unit 26.

Figure 15:
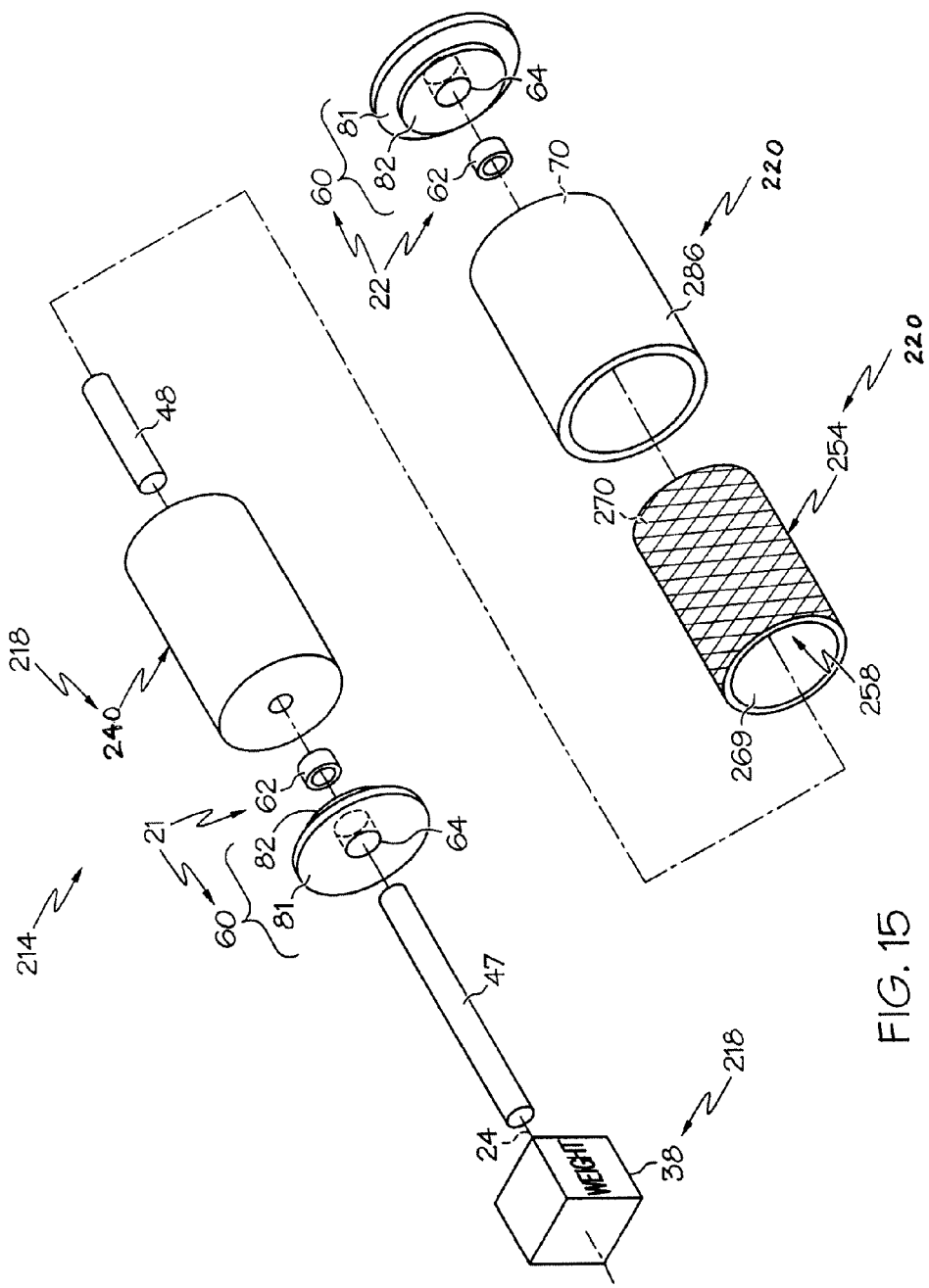
FIG. 15 is an exploded perspective view of another embodiment of the generator module showing that the generator module includes, from left to right, a gravity-positioned stator including a weight, a first end post, a first support including a cap and a bushing, a magnetic core, and a second end post, and a relative rotor including winding coil and a generator housing, and a second end support.

Another illustrative generator module 214 is shown in FIG. 15. As an example, generator module 214 may be used in modular power source 10 in place of generator module 14. Generator module 214 includes a GPS 218, a relative rotor 220, and supports 21, 22. As shown in FIG. 15, relative rotor 220 is formed to include an interior stator space 258 that is configured to receive GPS 218 therein. As is discussed below, in use, relative rotor 220 rotates about central axis 24 which extends along the length of the modular power source.

GPS 218 is coupled on one end to first support 21 and is coupled on the opposite end to second support 22 such that first and second supports 21, 22 are able to rotate about central axis 24 freely with respect to GPS 218. As an example, GPS 218 remains stationary relative to rotating first and second supports 21, 22. GPS 218 remains relatively stationary because it includes weight 38, as suggested in FIG. 15.

Generator module 214 provides electrical energy as a result of GPS 218 remaining stationary as relative rotor 220 rotates around GPS 218 similar to relative rotor 120. Relative rotor 220 illustratively includes a winding coil 254 and a generator housing 286. Coil 254 is coupled to generator housing 286 to move therewith and is positioned in generator housing 286. As an example, generator housing 286 is coupled to cover tube 32 to move therewith. GPS 218 includes weight 38, a magnetic core 240, and first and second end posts 47, 48 as shown in FIG. 15. Illustratively, end post 47 is coupled to magnetic core 240 and arranged to extend away from magnetic core 240 through first support 21 and through weight 38 to mate with a first housing support 23 included in outer housing 12. Second end post 48 is substantially the same as first end post 47 and is appended to the opposite end magnetic core 240 and configured to extend toward second support 22. First and second end posts 47, 48 are aligned along central axis 24 and cooperate with first and second supports 21, 22 and first housing support 23 so that GPS 218 may remain rotationally stationary relative to supports 21, 22. In other words, end posts 47, 48 remain generally stationary as well.

Illustratively, magnetic core 240 is a cylinder formed to include end-post apertures. End posts 47, 48 are arranged to extend through end-post apertures and mate with magnetic core 240 to cause end posts 47, 48 to move therewith. Furthermore, weight 38 is rigidly interconnected to magnetic core 240 by end post 47 to cause magnetic core 240 and weight 38 to be retained in place as relative rotor 220 rotates about central axis 24 during rotation of boring head 102. GPS 218 and relative rotor 220 of generator module 214 illustratively function like GPS 18 and relative rotor 20 of generator module 14.

As discussed above, modular power sources 10 and 110 each include a respective weight 38, 138 configured to remain rotationally stationary as modular power source 10, 110 travels around boring axis 88 of boring head 102. Accordingly, generator modules 14, 114, 214 each include a GPS and a relative rotor. GPS 18, 118, 218 of each generator module 14, 114, 214 remains rotationally stationary relative to the rotational motion of other components of generator module 14, 114, 214. Illustratively, both weights 38, 138 include a center of gravity that is offset from central axis 24 of each modular power source 10, 110 about which other components, i.e., relative rotor 20, 120, 220 are configured to freely rotate during operation drill string 84. It is this relative, rotational motion between GPS 18, 118, 218 and relative rotor 20, 120, 220 that generates electricity to power position transmitter 30 and/or charge battery 78 of modular power source 10, 110.

Modular power sources 10, 110 also each include control module 16. As discussed previously, control module 16 includes energy storage unit 26 and control system 28. Energy storage unit 26 is configured to condition and store electricity produced by respective generator modules 14, 114, 214. Control system 28 is configured to control release of electricity conditioned and/or stored in energy storage unit 26 to position transmitter 30.

Modular power sources 10 and 110 differ from one another because of generator modules 14, 114, 214. As an example, generator modules 14, 214 may be interchangeably used in modular power source 10 while generator module 114 is used in modular power source 110. The difference between generator module 14 and 214 is that in generator module 14, rotationally stationary GPS 18 includes weight 38 and coil 54 and relative rotor 20 includes magnetic sleeve 40, while in generator module 214, rotational stationary GPS 218 includes weight 38 and magnetic core 240 and relative rotor 220 includes winding coil 254. Generator module 114 is yet still different in that in generator module 114, GPS 118 includes weighted core 138 and magnetic sleeve 140 coupled around weighted core 138 and relative rotor 120 includes coil 154 wrapped around winding tube 152. Generator module 114 is somewhat like generator module 214 in that both generator modules 114, 214 have GPS that include the magnetic components and have rotors that include the coil components.

While the disclosure is susceptible to various modifications and alternative forms, specific exemplary embodiments thereof have been shown by way of example in the drawings and has herein be described in detail. It should be understood, however, that there is no intent to limit the disclosure to the particular forms disclosed, but on the contrary, the intention is to cover all modifications, equivalents, and alternatives falling within the spirit and scope of the disclosure.

There are a plurality of advantages of the present disclosure arising from the various features of the apparatus described herein. It will be noted that alternative embodiments of the apparatus of the present disclosure may not include all of the features described yet still benefit from at least some of the advantages of such features. Those of ordinary skill in the art may readily devise their own implementations of an apparatus that incorporate one or more of the features of the present disclosure and fall within the spirit and scope of the present disclosure.

The invention claimed is:

1. A modular power source configured for use in a rotating apparatus such as an underground boring head of a drill string in order to provide electrical power to another component in the rotating apparatus, the modular power source comprising an outer housing including a cover tube, a first conductor cap coupled to a first end of the cover tube, and a second conductor cap coupled to an opposite second end of the cover tube, wherein the cover tube, the first conductor cap, and second conductor cap cooperate to define a module space therebetween, a control module positioned to lie within the module space near the second conductor cap, the control module including a control system and an energy storage unit, wherein the energy storage unit is electrically coupled to the control system and the control system is electrically coupled to both the first and second conductor caps, a generator module positioned to lie within the module space between the first conductor cap and the control module, the generator module including a gravity-positioned stator and a relative rotor coupled to the gravity-positioned stator for rotation about a central axis, wherein the gravity-positioned stator and the relative rotor are configured to rotate relative to each other, and a weight included in the gravity-positioned stator to move therewith, the weight being positioned in the module space, wherein the weight includes a center of gravity offset from the central axis.

2. The modular power source of claim 1, wherein the gravity-positioned stator further includes a winding bobbin and a coil wrapped around the winding bobbin to move therewith.

3. The modular power source of claim 2, wherein the relative rotor includes a magnetic sleeve positioned in spaced-apart relation to the winding bobbin to move rotationally about the central axis relative to the winding bobbin.

4. The modular power source of claim 3, wherein the gravity-positioned stator further includes a post rigidly coupled to and positioned between the weight and the winding bobbin.

5. The modular power source of claim 4, wherein the weight includes a front surface formed to include a first aperture, a rear surface formed to include a second aperture, and a passageway arranged to extend between the first and second apertures, and further wherein the post is received through the first and second apertures.

6. The modular power source of claim 4, wherein the outer housing further includes a housing cap coupled to the first conductor cap and the cover tube to move therewith and configured to mate with the post of the gravity-positioned stator for rotation with the first conductor cap and cover tube about the central axis relative to the gravity-positioned stator.

7. The modular power source of claim 4, wherein the generator module further includes a support coupled to the relative rotor to move therewith and positioned between the winding bobbin and the weight, the support is formed to include a support aperture and the post is received through the support aperture.

8. The modular power source of claim 2, wherein the weight defines a generally triangular cross-sectional shape.

9. The modular power source of claim 8, wherein the weight includes a tungsten material.

10. The modular power source of claim 1, wherein the gravity-positioned stator further includes a magnetic core rigidly coupled to the weight.

11. The modular power source of claim 10, wherein the relative rotor includes a winding coil positioned in spaced-apart relation to the magnetic core to move rotationally about the central axis relative to the magnetic core and a generator housing coupled to and positioned between the winding coil and the outer housing.

12. The modular power source of claim 10, wherein the weight defines a generally triangular cross-sectional shape.

13. The modular power source of claim 1, wherein the gravity-positioned stator further includes a magnetic sleeve coupled to the weight to move therewith and is configured to provide a magnetic field.

14. The modular power source of claim 13, wherein the weight defines a generally frusto-circular cross-sectional shape.

15. The modular power source of claim 1, wherein the modular power source is sized and configured to be able to be held in a user's hand.

16. The modular power source of claim 15, wherein a length of the modular power source is approximately 4-8 inches and a diameter of the modular power source is approximately 1-2 inches.

17. A modular power source configured for use in a rotating apparatus such as an underground boring head of a drill string in order to provide electrical power to another component in the rotating apparatus, the modular power source comprising
an outer housing including a cover tube, a first conductor cap coupled to a first end of the cover tube, and a second conductor cap coupled to an opposite second end of the cover tube, wherein the cover tube, the first conductor cap, and second conductor cap cooperate to define a module space therebetween,
a control module positioned to lie within the module space near the second conductor cap, the control module including an energy storage unit and a control system, wherein the energy storage unit is electrically coupled to the control system and the control system is electrically coupled to both the first conductor cap and the second conductor cap, and
a generator module positioned to lie within the module space near the first conductor cap, the generator module including a gravity-positioned stator and a relative rotor coupled to the gravity-positioned stator for rotation about a central axis relative to the gravity-positioned stator, wherein the gravity-positioned stator includes a weight having a center of gravity offset from the central axis and the weight is configured to cause the gravity-positioned stator to remain at 0 degrees of rotation relative to the relative rotor while the relative rotor rotates about the central axis.

18. The modular power source of claim 17, wherein the gravity-positioned stator further includes a coil rigidly coupled to the weight for rotational movement with the weight relative to the relative rotor.

19. The modular power source of claim 18, wherein the relative rotor includes a magnetic sleeve rigidly coupled to the outer housing to move therewith about the central axis relative to the coil.

20. The modular power source of claim 19, wherein the gravity-positioned stator further includes a post coupled to and positioned between the weight and the coil.

21. The modular power source of claim 17, wherein the gravity-positioned stator further includes a magnetic sleeve coupled to an outer surface of the weight for rotational movement with the weight relative to the relative rotor.

22. In combination, a position transmitter and modular power source configured for use within a rotatable underground boring head of a drill string, the combination comprising
a position transmitter including a radio configured to emit a radio signal adapted to be received by a position-transmitter receiver, and
a hand-held modular power source configured to electrically power the position transmitter including
an outer housing including a cover tube, a first conductor cap coupled to a first end of the cover tube and electrically coupled to the radio, and a second conductor cap coupled to an opposite second end of the cover tube and electrically coupled to the radio, wherein the cover tube, the first conductor cap, and second conductor cap cooperate to define a module space therebetween,
a control module positioned to lie in the module space near the second conductor cap, the control module including an energy storage unit and a control system, wherein the energy storage unit is electrically coupled to the control system and the control system is electrically coupled to both the first conductor cap and the second conductor cap, and
a generator module positioned to lie in the module space near the first conductor cap, the generator module including a gravity-positioned stator and a relative rotor coupled to the gravity-positioned stator for rotation about a central axis relative to the gravity-positioned stator, wherein the gravity-positioned stator includes a weight having a center of gravity offset from the central axis.

* * * * *